United States Patent
Frankel et al.

(10) Patent No.: US 6,449,611 B1
(45) Date of Patent: Sep. 10, 2002

(54) BUSINESS MODEL FOR RECOVERY OF MISSING GOODS, PERSONS, OR FUGITIVE OR DISBURSEMENTS OF UNCLAIMED GOODS USING THE INTERNET

(76) Inventors: Fred Frankel, 350 S. Ocean Blvd., Suite 6C, Boca Raton, FL (US) 33432; Henrietta Frankel, 350 S. Ocean Blvd., Boca Raton, FL (US) 33432; Allen David Hertz, 12784 Tulipwood Cir., Boca Raton, FL (US) 33428

( * ) Notice: Subject to any disclaimer, the term of this patent is extended or adjusted under 35 U.S.C. 154(b) by 0 days.

(21) Appl. No.: 09/562,349

(22) Filed: Apr. 27, 2000

Related U.S. Application Data

(60) Provisional application No. 60/156,802, filed on Sep. 30, 1999.

(51) Int. Cl.$^7$ .............................................. G06F 17/30
(52) U.S. Cl. ............................................. 707/6; 707/10
(58) Field of Search ................ 707/1–7, 10, 104.1, 707/204; 705/37

(56) References Cited

U.S. PATENT DOCUMENTS

| | | | | |
|---|---|---|---|---|
| 5,521,815 A | * | 5/1996 | Rose, Jr. ...................... | 705/28 |
| 5,568,406 A | * | 10/1996 | Gerber ........................ | 702/159 |
| 5,955,952 A | * | 9/1999 | Bergman et al. ......... | 340/573.1 |
| 5,983,238 A | * | 11/1999 | Becker et al. .............. | 707/104 |
| 6,034,605 A | * | 3/2000 | March ...................... | 340/573.1 |

FOREIGN PATENT DOCUMENTS

WO      99/48250    * 9/1999    ............. G06F/1/00

OTHER PUBLICATIONS

Radcliffe "The insurance industry's use of databases to prevent and detect fraud and improve recoveries", European convention on security and detection, IEE 1995, pp. 216–224.*

* cited by examiner

Primary Examiner—Safet Metjahic
Assistant Examiner—Uyen Le
(74) Attorney, Agent, or Firm—Brian S. Steinberger; Law Offices of Brian S. Steinberger, P.A.

(57) ABSTRACT

A method and apparatus using the worldwide web portal site to provide, publish and maintain a database for missing/stolen items and missing persons/fugitives. The method and apparatus further utilize this database as a backbone for an internet portal, providing for automated contact of interested parties, automated e-commerce for replacement of assets, and immediate distribution of published information. The invention allows for extracting information from entered police reports to create an all encompassing database, and provides a method for deterring the selling of stolen items, increasing the potential of recovering stolen or missing items, and simplifying the claim processing process and finding missing persons and fugitives.

11 Claims, 8 Drawing Sheets

BUSINESS MODEL FOR RECOVERY OF MISSING GOODS, PERSONS, OR FUGITIVE OR DISBURSEMENTS OF UNCLAIMED GOODS USING THE INTERNET

This invention claims priority to Provisional Patent Application 60/156,802 filed Sep. 30, 1999.

FIELD OF THE INVENTION

The invention relates to a business model for using the world wide web to provide and disseminate a central data base of stolen goods, missing goods, recovered goods, missing persons, fugitives and activate automated recovery devices, and utilize publicity and public awareness for the database. The invention further provides automated notification, automated temporary or permanent replacement of items, and optionally using e-commerce and/or electronic auctions for replacement.

BACKGROUND OF THE INVENTION

Currently the Law Enforcement Agencies do not have a worldwide database for stolen items or assets, much less a single national or global database. Typically a police report is taken and only physically filed which includes information pertaining to the stolen assets. If the reporting party has the serial number, the serial number is distributed on a teletype. A majority of smaller sized stolen items (cameras. jewelry, musical instruments, tools, firearms, etc.) are dispersed through pawnshops. Pawnshops are required to report all items taken in by using a method such as one commonly referred to as "Pawn Track". Pawn dealers are not provided a database of stolen or missing assets which they can use to determine the proper ownership of assets prior to accepting them for pawn. The recovery of stolen items distributed through pawnshops is low. Once a pawn broker fronts money for an item, if the item is determined to be stolen, the victim is required to pay the pawn broker the amount the pawn broker fronted. The current process places the recovery in a post-mortem position. The current situation presents a grim picture for recovery and return of stolen or missing items.

Flea Markets and Pawnshops provide an easy outlet to distribute goods. Pawnshops are somewhat regulated and required to provide lists of received items as described above. Flea Markets are not regulated and particularly difficult to police for stolen goods, as are other unregulated outlets such as art shows, gun shows, outdoor sporting good shows, hobby shows, or other exhibitions. These unregulated sales outlets present opportunities for persons to distributed goods having unknown backgrounds.

There is currently no single worldwide place to advertise stolen goods/missing goods, fugitives, missing persons, and other types of found items. There are several companies that utilize public records to locate persons. When a person is trying to avoid being found, the use of public records often becomes futile.

Publications, including newspapers, periodicals, and magazines are limited to a printed media, whereby the media does not provide a continuing database. Publications are limited to providing the information for a limited time period. Newspaper classified sections include a lost and found section, but no stolen goods section. The consumer is required to phone or fax in an advertisement, which is placed in queue for printing and finally distributed at a later date. The newspaper advertisements are limited to text, whereby pictures would greatly enhance the recovery effort. Newspapers are also limited to the regions in which the newspaper is distributed. Printing and distribution of the newspapers is costly, utilizes natural or recycled resources, and energy.

Photographs and information related to missing persons are often distributed through milk cartons or prints. Photographs and information related to fugitives are generally printed and posted at the US post office. These are generally limited to geographic regions in which authorities feel these persons can be located.

For stolen goods, the police provide a list (an example is referred to as Pawn Track) of stolen goods primarily for identification of stolen goods for Pawnshops to compare goods against. The list is dispersed weekly to police departments and Pawnshops with less frequent updates.

A television show "America's Most Wanted" illustrates the advantages of taking police wanted lists public and using the public to track the wanted persons. The show presents individual cases of wanted persons re-enacting the crime and presenting the possible paths of the fugitives.

A television show "Unsolved Mysteries" illustrates the advantages of taking missing persons or other unsolved scenarios public and using the public to resolve the unsolved scenario.

Insurance companies or individuals generally provide a reward upon the recovery of the goods.

Recovery systems, such as LoJack™ are currently available, where the user would notify the proper agency to activate a homing device located within the object.

The Inventors are not aware of prior art systems that allow for the victim (individual, insurance company, or others) to promote the loss immediately and as expansively as possible, using existing media, preferably within one location or access point. None of the prior art systems support potential changes to the current processes whereby the present invention would provide a mechanism for a proactive approach to increasing the risk for return and limiting the distribution of stolen assets. None of the prior art systems provide for an inquiring user to access the database from virtually any location using many known methods to determine the background of an item. The same can be applied to missing persons and fugitives.

Further, none of the prior art systems allow one to remove unnecessary personal interface requirements to notify the insurance company, file a claim, provide a police report, and receive either the claim value, a temporary replacement, or a permanent replacement. It is desirable for the insurance company to replace the stolen or missing item at the lowest cost.

The inventor is aware of several patents that propose potential systems and techniques. See for example, U.S. Pat. Nos. 5,299,116 to Owens, et al.; 5,424,944 to Kelly et al.; 5,748,083 to Rietkerk; 5,841,116 to Lewis; 5,878,416 to Harris et al.; 5,912,947 to LangenKamp et al.; and 5,955,952 to Bergman et al.

The '952 patent to Bergman et al. refers to a "method and system for locating a lost person or lost personal property" and mentions the "world wide web", column 4, lines 52+. However, the patent systems is limited to only being able to show "the photograph (of a missing person) . . . on a world wide web page on the internet: and not to complete a business model for the recovery of stolen goods, missing persons or fugitives,: that overcomes all of the problems with the prior systems and techniques previously described.

SUMMARY OF THE INVENTION

The first objective of the present invention is to utilize the internet (or similar) as a portal for providing a data base for stolen items.

The second objective of the present invention is the ability for the lossee (or other interested party) to promote and publish the stolen item (loss) immediately.

The third objective of the present invention is to immediately disseminate information globally pertaining to lost goods.

The fourth objective of the present invention is to promote unsolved scenarios, such as hit and run s, thefts, homicides, and other suspicious events in which law enforcement have an interest.

The fifth objective of the present invention is to automatically notify an insurance company (or other party of interest) of a loss, whereby the insurance company could initiate claim proceedings.

The sixth objective of the present invention is for a web portal to provide e-commerce solutions to temporarily or permanently replace the subject items.

The seventh objective of the present invention is for a web portal to provide auctions, reverse auctions, and competitive shopping analysis for insurance companies to provide replacement items at the lowest cost. Since the claim can provide an adequate description of the subject item, the replacement process can be self-generating.

The eighth objective of the present invention is to automatically provide direct email to a claimant from either a web site providing a list of business alliances and pricing comparisons for replacement items, directly from a business alliance of a web portal, or other party interested in replacing the item.

The ninth objective of the present invention is the ability to provide targeted banner advertising during each web page view, whereby the advertisement can be based upon the category or subject of the item or items listed, and can include the type of insurance that can be utilized, the type of item being listed, or other.

The tenth objective of the present invention is to provide instant access anywhere, as the internet can be accessed via modems using land lines, via publicly located internet access devices, portable internet access devices (wireless), or any other means for delivering and receiving information from a central database of stolen goods, missing goods, recovered goods, missing persons, fugitives, or activation of automated recovery devices The eleventh objective of the present invention is a means that can be downloaded to computing devices, placed on portable storage media such as floppy disks, compact disks, or printed for those not having access to computers or the internet.

The twelfth objective of the present invention is to categorize listings using any of various categories, including but not limited to item classification, location, date, method of loss (stolen or lost). Examples of the item classification would be jewelry, photography equipment, vehicles, bicycles, clothing, fine art, firearms, sporting goods, etc. Other examples would be using terms of common usage or standards already subjected within the industry, such as MPR for missing persons report. The classifications can be further utilized for determining the respective advertisements in conjunction with the category being viewed.

The thirteenth objective of the present invention is to provide a means where the individual recovering the goods and the party seeking the goods can correspond, or utilize the agency for anonymity, whereby a case or ID number would be assigned to a particular posting.

The fourteenth objective of the present invention is to provide a service whereby the internet site operating agency can act as an agent for the party seeking return of the goods for immediate correspondence with the party recovering the goods.

The fifteenth objective of the present invention is to provide an operating agency to acquire income based upon posting fees, rewards, and awards from the party seeking return of goods.

The sixteenth objective of the present invention is to subsidize income through advertisements posted on the web portal site and/or seek contributions from parties impacted.

The seventeenth objective of the present invention is to act as an agent for replacing items by competitive bids, reverse auctions, and other method of using e-commerce to purchase replacement items at a lowest possible cost. It would be recognized that alliances would benefit from this process.

The eighteenth objective of the present invention is to utilize the public as a primary agent for finding the missing goods through listings available on a web portal site.

The nineteenth objective of the present invention is to provide a finder's fee to a party which returns lost goods.

The twentieth objective of the present invention is to disseminate information on missing goods and missing persons quickly and at a low cost.

The twenty-first objective of the present invention is to allow all police agencies to utilize a single system on lost goods and missing persons.

The twenty-second objective of the present invention is to use web site(s) to activate a recovery system.

The twenty-third objective of the present invention is to utilize an electronic circuit, an integrated circuit sometimes referred to as a computer chip or other recovery circuit for tracking items, whereby the circuit can be activated by a signal transmitted via any of many known methods, or for verification of ownership.

The twenty-fourth objective of the present invention is to globally provide a database for registration of ownership of objects, tracking ownership for objects, particularly those which can interface with computers and/or the internet. The object can include an electronic serial number which is compared to the data base for owner verification. Examples of such goods are digital cameras, computers, and personal data assistants. An example includes providing a serial number when storing information on a device. Upon reading the stored information, the serial number can be compared against a registration site on the internet. One example would be a digital camera, storing a serial number with each picture. Manufacturers and vendors would provide a means to track and register items for such things as warranties and theft.

The twenty-fifth objective of the present invention is for all respective parties to maintain anonymity for protection of all parties involved with missing persons or lost goods, whereby the primary purpose of the system is to provide a means for recovering items and finding missing persons.

The twenty-sixth objective of the present invention is to post found items, including those located by authorities during recover- operations for natural disasters such as storms, earthquakes, tornadoes, and floods.

The twenty-seventh objective of the present invention is to attract and maintain users to view a web site using promotional tactics such as giveaways and auctions for items such as confiscated goods, and the like.

The internet/world wide web provides a vast medium for providing information and interactions between individuals.

The internet has the capability to present multimediums, including but not limited to photographs, drawings, text, video, and audio. The internet allows anyone to disseminate information immediately providing real time access for the world to view. The internet provides for free or low cost distribution of information. A user can view the information on a display, download the information to a computing device, and print the information. Computers and the internet provide a variety of methods for searching through large data bases in a expeditious manner.

Public accessible internet terminals are being placed, whereby a user can access the internet using methods similar to a public or pay telephone.

Wireless media technology provides access to the internet and will continue to advance to provide more methods to access this distribution media. These advances will allow users to access the internet from virtually anywhere at anytime.

E-commerce provides for secured purchasing of items using the internet. The internet further provides a medium for electronic auctions. These auctions can be provided in either standard or reverse formats, as provided by such companies as E-Bay and Priceline, respectively.

The internet provides an automated means whereby a web site can post a request for price quotes for a subject item and associated e-commerce businesses can bid for the sale. The internet would provide open bidding whereby the companies would be presented the details and the lowest price of the subject item.

Email provides a mechanism for electronically transferring information. Email further provides the ability to include enclosures or attachments. It is also well understood that email can be automatically generated based upon some automated initiator.

BRIEF DESCRIPTION OF THE DRAWING

For the purpose of initially illustrating the invention, there is shown in the drawings, embodiments which are presently preferred. It should be understood, however, that the invention is not limited to the specific instrumentality and methods disclosed. It can be recognized that the figures represent a layout in which persons skilled in the art can make variations therein.

DETAILED DESCRIPTION OF THE DRAWING

Figure 1:
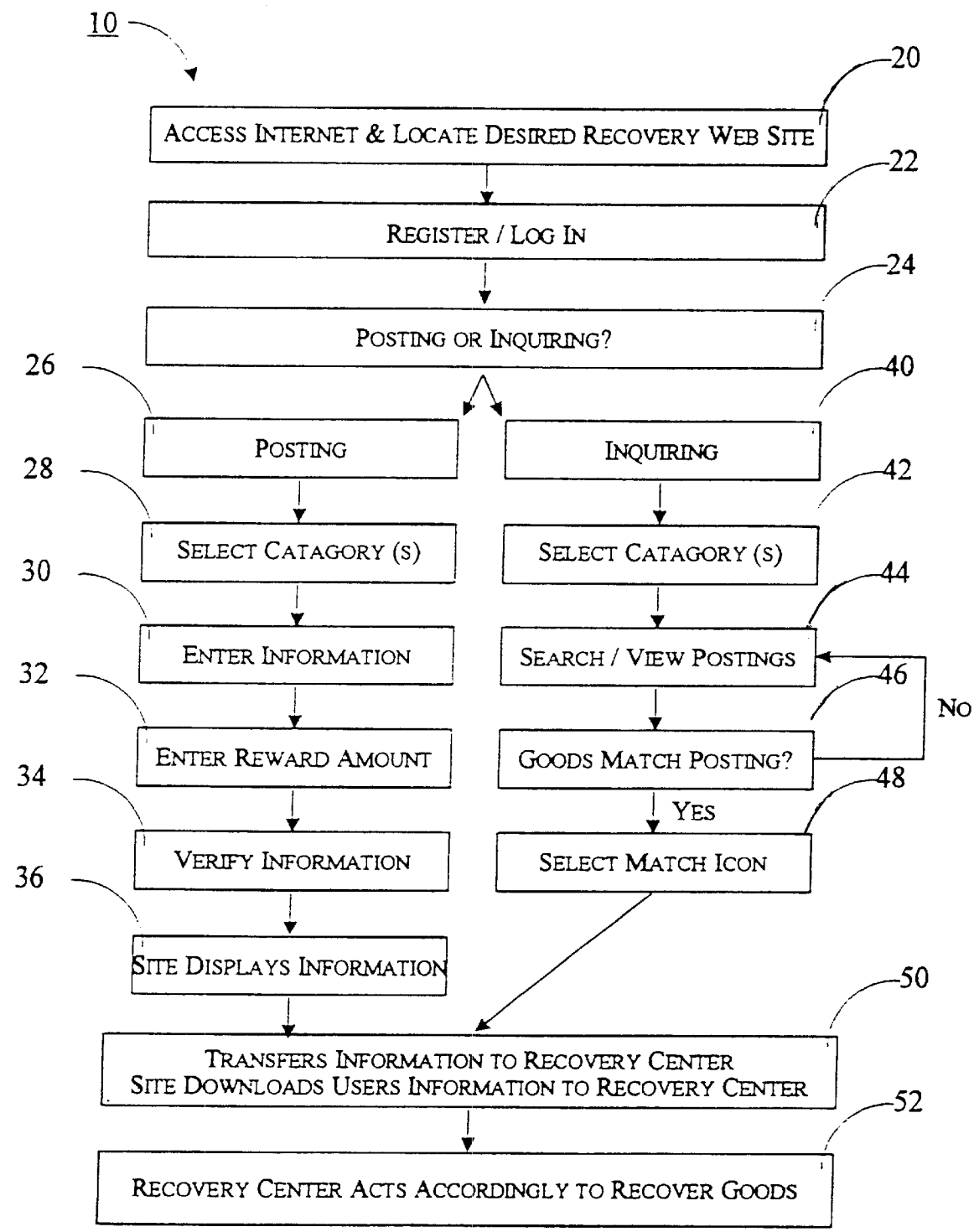
FIG. 1 illustrates a user's operational flowchart sequence of the novel stolen goods/lost item web site.

FIG. 1 illustrates an example of a user's operational flow diagram 10 whereby in the first step 20, the user would access the Internet using methods such as but not limited to modem, cable modem, wireless modem, DSL, and the like. Upon accessing the Internet, the user would locate a goods recovery web site methods such as, but not limited to portal search engines, bookmarks, referrals advertisements and the like. In the second step 22, for a first time user, the user registers by entering requested information. The requested information would then be stored in a database for future use. For any subsequent use, the user would only required to complete a log in process. The log in process can include entering a user identification code and a password, whereby the password is requested for protecting the user and the agency. In the third step 24, the user would decide whether to post for missing goods (posting) or whether to determine if goods are being sought after (inquiring). Should the user select to post missing goods the operational flow continues under step 26, posting. Should the user select inquiring, the operational flow continues under step 40, inquiring. In the fourth step 28, the user selects a category to narrow the search. The categories can be based upon description of the item (size, shape, color), approximate location where the object was last seen. potential of where the object can be found (such as a pawn shop), and any other logical category to ease searches. The categories can be provided to the user whereby the user then selects the categorie(s). To ensure the sought after item may not overlooked by an inquiring user, the posting user posting can select multiple categories to list the goods. In the fifth step 30, the posting user enters the respective information to describe the goods. The web site can prompt the user as to what can be considered the optimal information. The web site can determine what the optimal information would be based upon the selected categories to ensure the goods recovered correctly belongs to the posting user. Examples of different requirements include electronics goods would have model and serial numbers. Jewelry can be described by physical description, size, color, precious stones, engravings, and the like. Additionally, the user can enter other information such as but not limited to pictures, sound, other media and the like to improve the accuracy of recognition. The web site would interface with the posting user to determine, on a case by case basis and predetermined criteria, an award amount. The posting user can input a selected reward amount in step 32 (the sixth step). In the seventh step 34,36, the web site displays the information and requests the posting user to verify for accuracy. For legal protection, the web site will also ask the posting user to validate actual ownership of the posted goods. for example agree to a sworn under oath declaration statement and the like. The web site will then post the information in conjunction with other existing posting for inquiring users to search through. In the seventh step 34,36, the web site presents a preview of the post to the posting user whereby the posting user would verify and validate the information with a yes keystroke. In the eighth step 50, the web site will transfer the posted information to the respective storage locations and indices. Storage locations and indices are files maintained within the database to aid in organizing or structuring the various entries made by the posting user. Examples of storage locations can be separate files for jewelry, photography equipment, bicycles, automobiles, and the like. To increase efficiency during searches, the various categories can be assigned numbers instead of a complete name. An index can be created to assist the web site in correlating the number to the category. An inquiring user would follow the inquiring 40 path of the operational sequence 10. In the ninth step 42, the inquiring user would select a category such as those described in step 28, and continuing in the tenth step 44, using known search methods such as a Boolean search, to review the postings. In the eleventh step 46, the inquiring user would determine if the goods located match the subject goods described in the posting. If there were no matches, step 44 should be repeated. If a yes match occurs, in the twelfth step 48, the inquiring user would select the located icon. When the located icon is selected, in the thirteenth step 50, the web site automatically provides the inquiring user's contact information (i.e. names addresses, and the like) such that the agency can recover the subject goods. In the fourteenth step 52, the agency or recovery center acts accordingly to recover the subject goods. The described process utilizes subject goods as the primary focus. It can be recognized that the same process can be used to locate missing persons and fugitives as well as found items.

Figure 2:
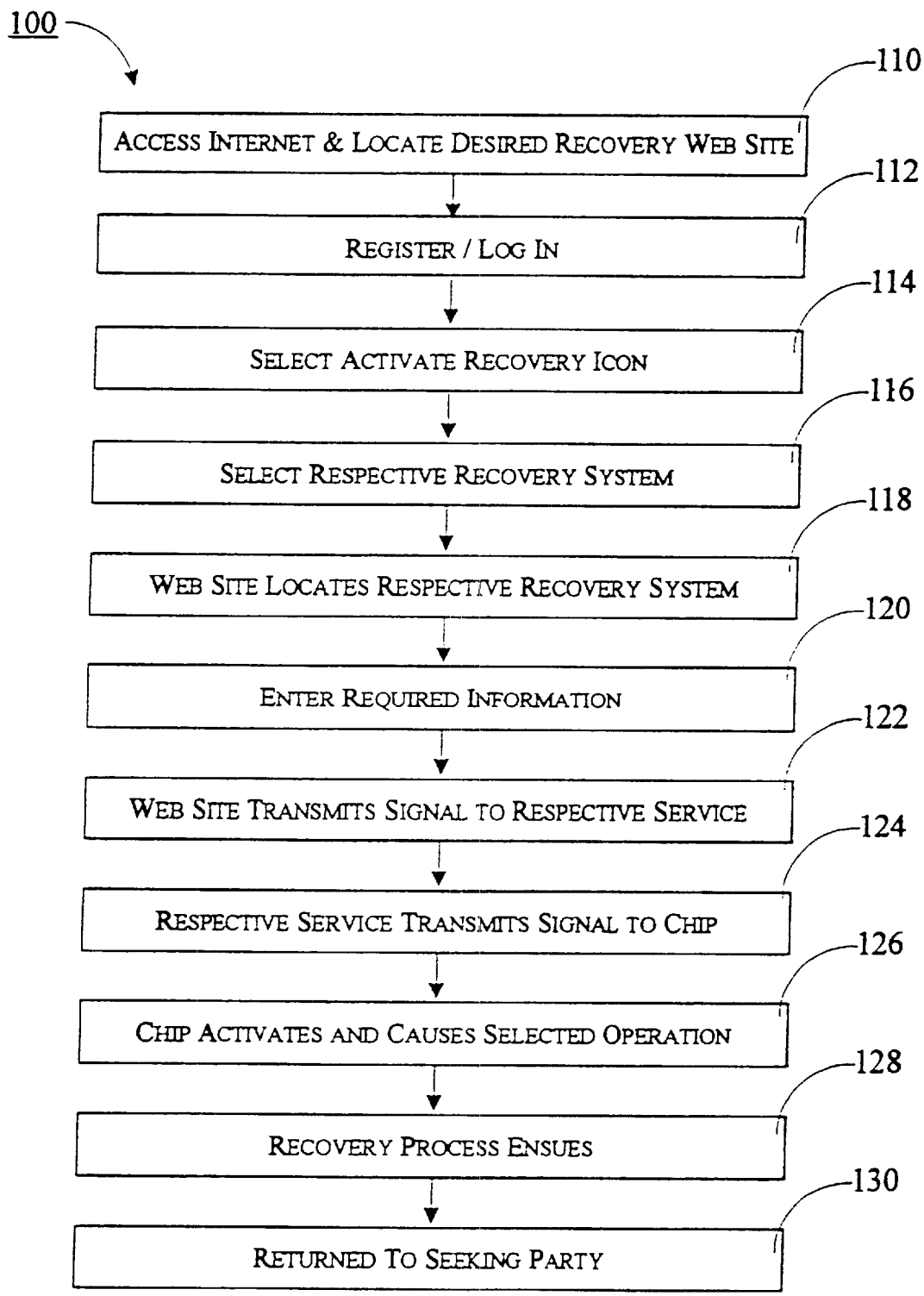
FIG. 2 illustrates a user's operational flowchart sequence of how to activate a recovery system utilizing the novel recovery activation web site.

FIG. 2 illustrates an automated recovery flowchart 100 using the novel web site to activate an automated recovery system. In the first step 110, a seeking user would access the internet and locate the desired recovery web site using any of the known methods such as typing in a domain name and the like. In the second step 112, the seeking user would register or log in, depending upon whether this is the initial time for the user (register by providing the requested information <i.e. name address, and the like>) or a subsequent time for the seeking user. The web portal site would maintain the user information in a user information database. The user would not be required to provide the complete information upon any subsequent log in processes. The user would then only need to provide a user identification code and a respective passcode. The web portal would compare the user identification code and passcode to the database. If they are correct, the user would not have to provide any additional information. In the third step 114, the seeking user would select and activate a recovery icon located on the web page by clicking on the icon. Upon the selection, the web site would record the seeking user's information from the information provided during the initial registration stored in the registered user's data base, and the recovery system requested for tracking purposes. A recovery system can be contacting a courier, providing the courier with the address of where the object to be recovered is. The courier would then pick up the object and be responsible for shipping the object to the recovering agency. The recovering agency would then forward the object to the rightful owner. It is desirable to track the location of the object and the parties involved from the initial response of the inquiring user through the recovery process until the object is returned to the rightful owner. The web portal site would provide a number of choices for the recovery process. In the forth step 116, the web site would request which recovery system is to be selected. In the fifth step 118, the recovery system web site searches the database to determine the rightful owner and the rightful owner's contact information. The fifth step 118 also initiates the recovery system. It can be recognized that this step can be included in the agency web site, and acted on accordingly from the agency web site. In the sixth step 120, the seeking user would enter the required information from the fifth step 118. The web site would verify the entered information is complete, accurate, and of correct ownership by comparing to previously submitted information and the like. In the seventh step 122, the web site would transmit a signal via any of the many known methods of transmission to a respective service carrier (such as through modem connections, paging systems, and the like). It can be recognized that the agency, web site, and the like be the respective service carrier as well as an outside source. In the eighth step 124, the respective service transmits a signal which is received by some form of receiver, decoded by some method of decoding, and acted upon following some form of predetermined means. It is recognized that there are many methods of transmitting a signal, using wires or wireless technology, encoding and decoding a transmitted signal, and providing a means to act upon a decoded signal. One known example would be using a paging service signal which is received by a paging type receiver; a paging type decoder which decodes the received paging service signal; and a controller which utilizes the decoded signal to operate a vehicle door locking mechanism to lock or unlock vehicle doors. It can be recognized that the information can further originate from a web site, transfer using email, and any other data transmitting mechanism via modem through the internet to a selected site, terminal, and the like. The end site can include a wireless transmitter which translates the information into an encoded signal and uses an RF signal to transmit the encoded signal to the selected receiver. The receiver would decode the transmitted signal using and RF decoding technology to provide decoded data. In the ninth step 126, the received and decoded data would be compared to encrypted data such as a serial number, and if the decoded data matches the encrypted data, a recovery, electronic circuit which can be included in an integrated circuit (sometimes referred to as a chip), activates a selected operation. For a vehicle, it could be flashing the lights and energizing the horn using relays included in an electronic recovery circuit to obtain attention until the authorities arrive. In the tenth step 128, the recovery process ensues. It can be recognized that upon activation of the recovery system, it would also be advantageous to notify the proper authorities. By creating a scenario whereby the public would recognize the selected operation being unusual, it would generally draw attention to the public, whereby they would inquire to the authorities. As an alternative, the invention can inactivate the located equipment, and preferably present a message to call a specified access number to request help. The message can be displayed on the object using an liquid crystal display, illuminates a light which identifies why the selected operation is being completed, or the like and providing a message of what actions should be taken. Upon the request, the proper recovery process would ensue. In the final step 130, the recovered goods would be returned to the seeking party.

Figure 3:
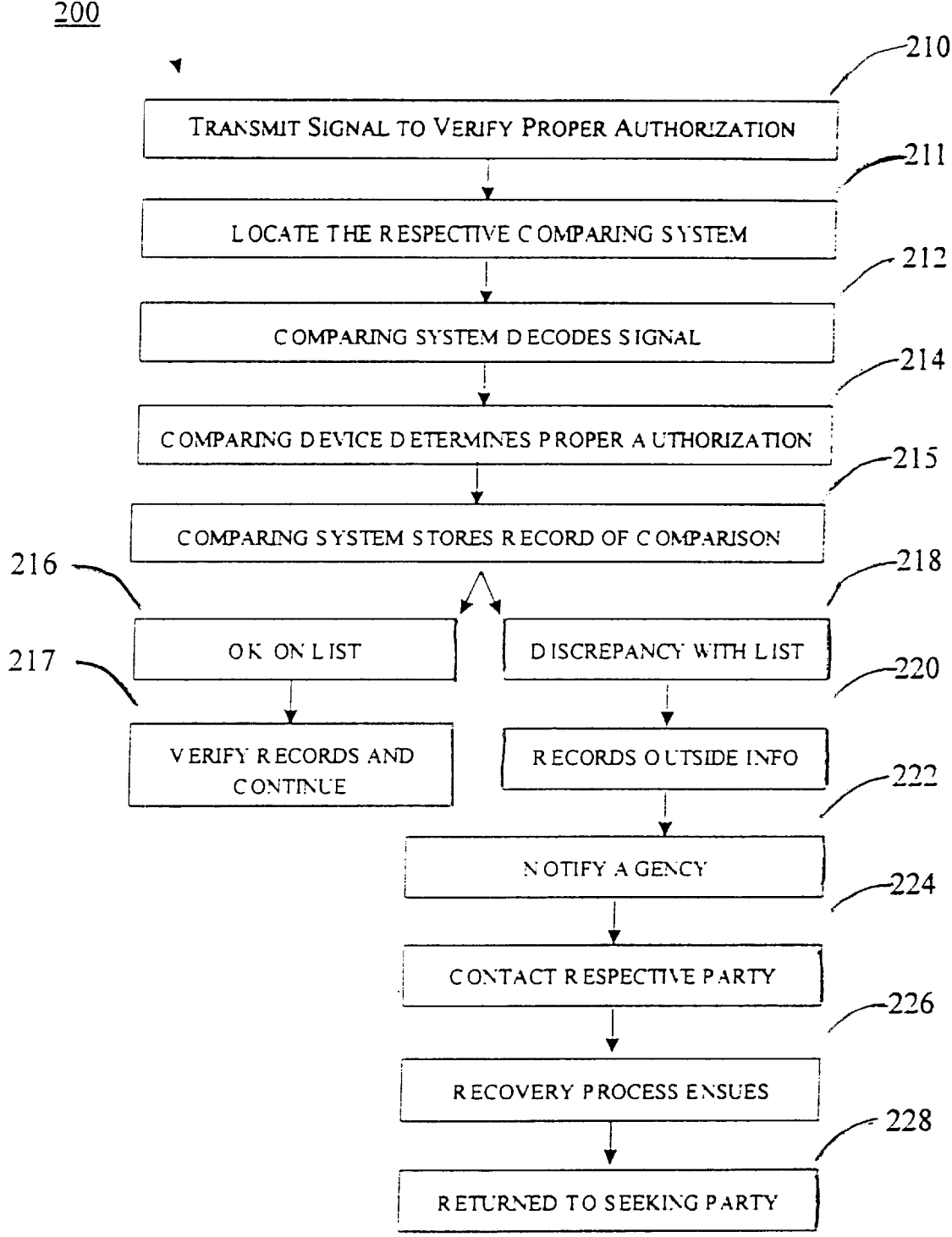
FIG. 3 illustrates a log in automated verification system using an internally coded electronic serial number for the invention.

FIG. 3 illustrates a method of automated ownership verification flow diagram 200, whereby an electronic serial number would be utilized to either verify, proper ownership or user authorization. In the first step 210, the program would transmit a signal to a selected receiver, whereby one example would be a computer logging into the internet. The program can be included within any electronic device or removable storage device capable of interfacing with the internet. The method of interface can include wired or wireless technology. During the initial sequence of transmission. the program would encode a means to identify the location of an ownership determination site, an electronic identification number, and other respective information. The program would access the selected terminal, router, or other receiving/database comparing device. In the second step 211, the method would use the means to identify the location of an ownership determination site to locate the respective comparison system. In the third step 212, the respective comparison site would decode the transmitted information into a usable format, preferably extracting the EIN from the signal. In the fourth step 214, the EIN would be compared against a database for ownership and/or authorization. In addition to information (EIN, etc.) submitted automatically by the program, the method can further include a requirement for the user to submit a pass code to verify proper authorization of use of the device. The data base is updated to provide for any change in status, should the device become stolen or missing, should the user not pay for a service, should the user limit access, and the like. In the fifth step 215, the comparing system can optionally record the submitted request for verification, the date of verification, the source of the inquiry, and the like. Should the comparison determine an acceptable authorization, the sixth step 216 is enacted and in the seventh step 217, the system can optionally request the user to verify any registration information such as address, phone number, email and the like, and enables the user to continue posting other information and the entered information is stored in the data base. Should the comparison determine an unacceptable scenario, the eighth step 218 ensues, whereby in the ninth step 220, the recovery system would attempt to record any potential outside information such as dialed in phone number, Internet Protocol (IP) address, RF signal receiver, and the like to determine the geographic region where the device can be recovered. In the tenth step 222, the recovery system would notify the recovering agency by transmitting a signal via wireless transmission, modem, or the like. Upon notification, the agency would follow the respective procedure to begin recover of the item. The recovery procedure can be directing a courier to pick up the object, and transporting or shipping the object to the agency or the rightful owner. An alternative recovery procedure can be providing the party who recovered the object with shipping instructions to ship the object to the agency. In the eleventh step 224, the agency would notify the respective parties, including the party seeking return of the goods and the party currently using the goods. The party seeking return of the goods would have provided a method for contacting them such as an email address. phone number, or the like. whereas it would not be desirable that the party currently using the goods be notified that they have been detected of having goods that is not rightfully theirs. The system would utilize any of known methods of detecting where the signal is being transmitted. Once the system determines the geographic location respective to the origin of the signal, the system can initiate the twelfth step 226; the process for recovery. Since the normal interfacing would be two way transmissions, the system should have the ability to approximately locate recovered goods and further, it would behoove the system to transmit a signal to the device to activate or employ a recovering procedure within the device. The recovery procedure can deactivate the unit, or cause the unit to continuously transmit a recovery signal to provide the location of the goods. The agency would initiated a recovery procedure using the acquired information to locate the device. The recovery process can include sending a party to the geographic location respective to the origin of the signal to recover the item(s). In the thirteenth step 228, the device would be returned to the party seeking return of the goods.

Figure 4:
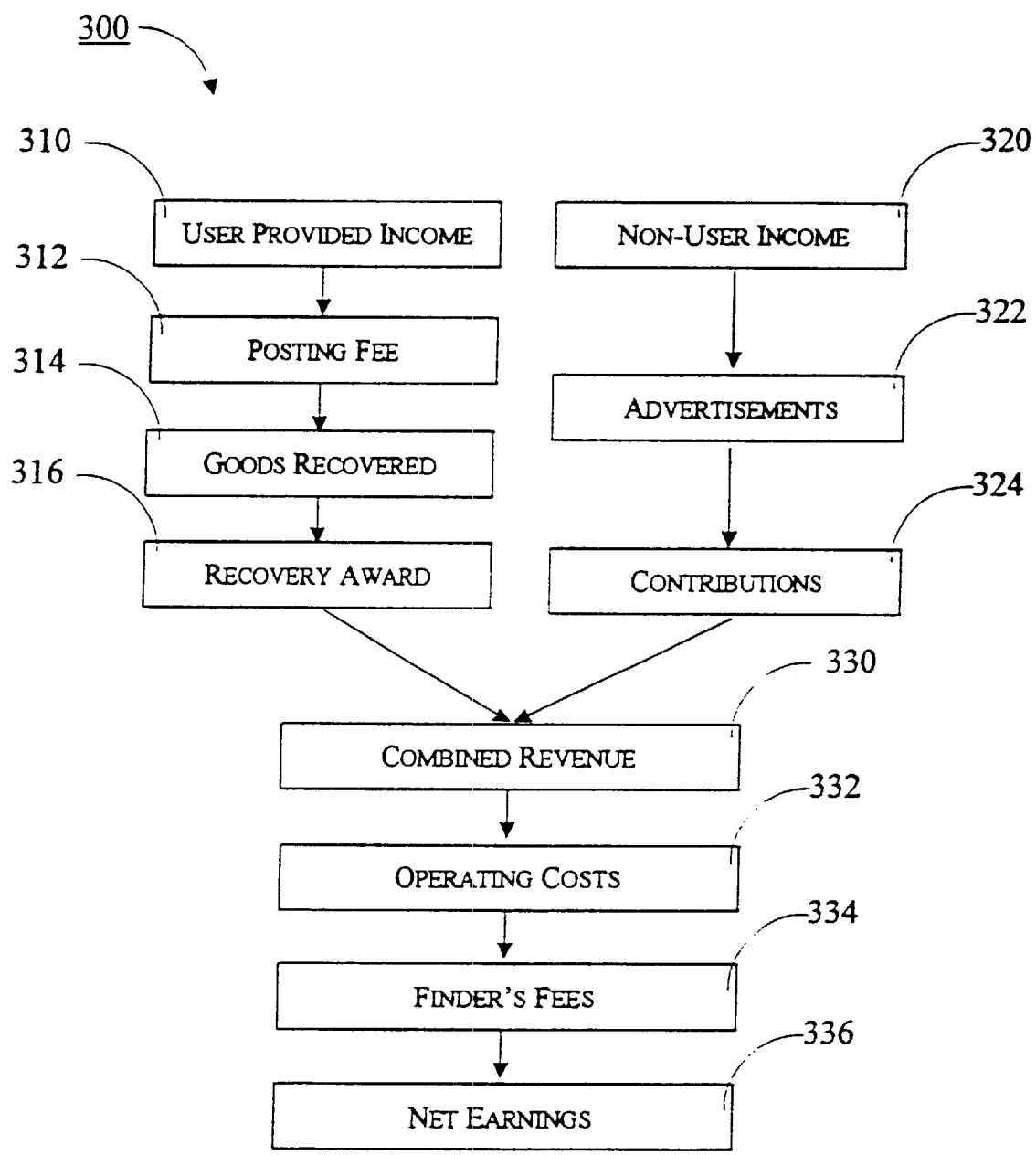
FIG. 4 illustrates a financial flowchart diagram of how the novel register/recovery business model receives and disperses funds.

FIG. 4 illustrates a financial flow sequence 300 providing a financial means to support the business. Revenue would be provided by two (2) primary means: in the first primary means 310, the revenue is provided by payments from the actual user income. In the second primary means 320, the revenue is provided through payments from non-user such as advertisers, percentages of the rewards, contributions, or the like. The user provided income 310 can include a posting fee 312, whereby the user can be required to pay a fee to post the information. The fees can be contingent upon recovery of the goods, whereby should the goods be recovered 314, the user would be required to pay a recovery award 316 as previously determined and agreed upon prior to the posting. The non-user provided income 320 can include advertisements 322 or contributions 324. Target advertisers would be insurance companies, equipment manufacturers, anti-theft device manufacturers, and the like. Contributions 324 can be provided by authorities such as police, sheriff, customs, FBI, and the like. Additional revenue can be provided by companies upon registration of the recovery devices embedded within goods, and the like. The combined revenue 330 is then subjected to operating costs 332, finder's fees 334 and the like to determine the net earnings 336. The agency can opt to reduce posting and/or recovery fees for non profit organizations and each scenario can be independently decided.

Figure 5:
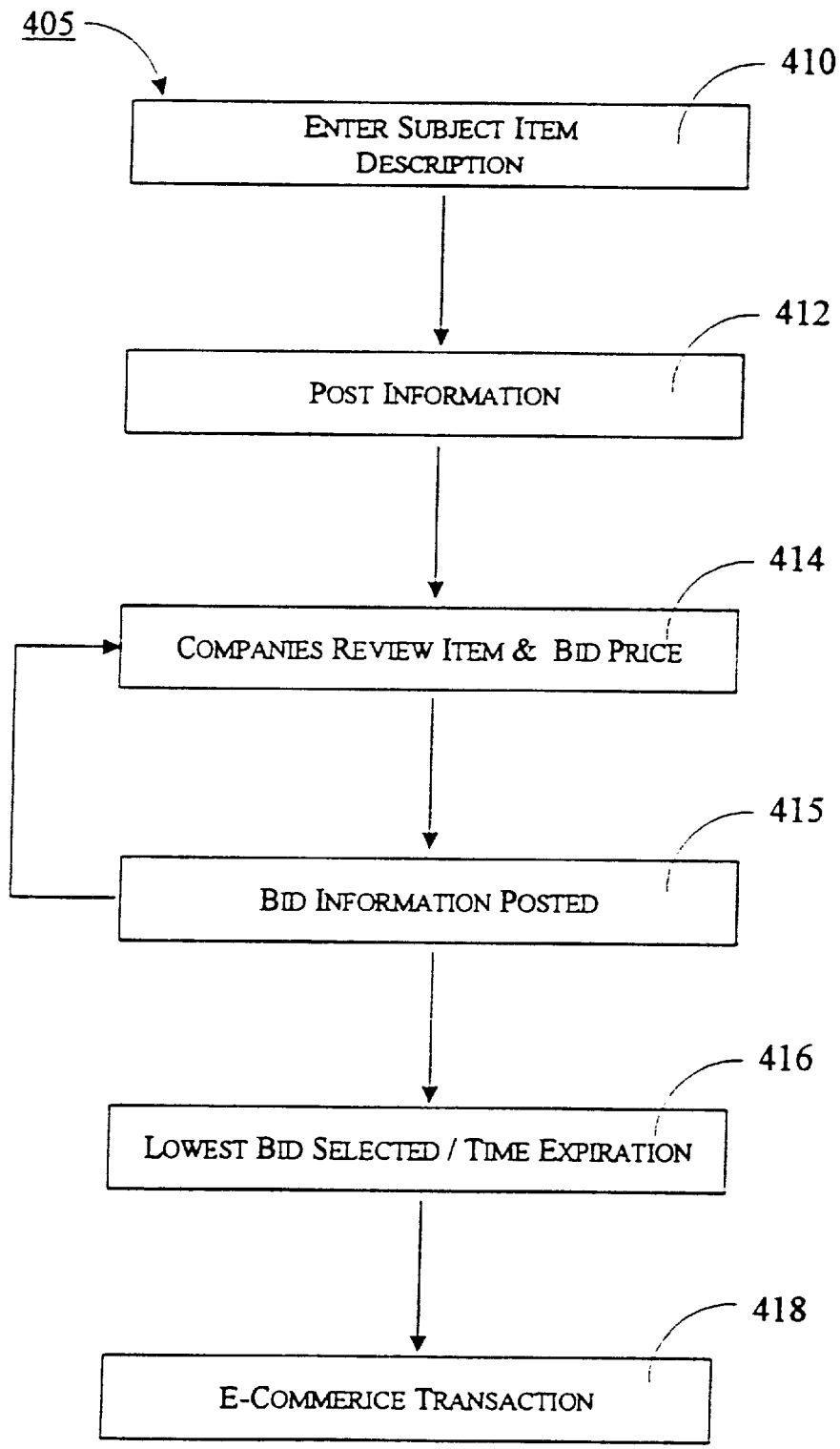
FIG. 5 illustrates a flowchart diagram of a competitive bid process for procurement of a lowest priced item using the Internet.
Figure 6:
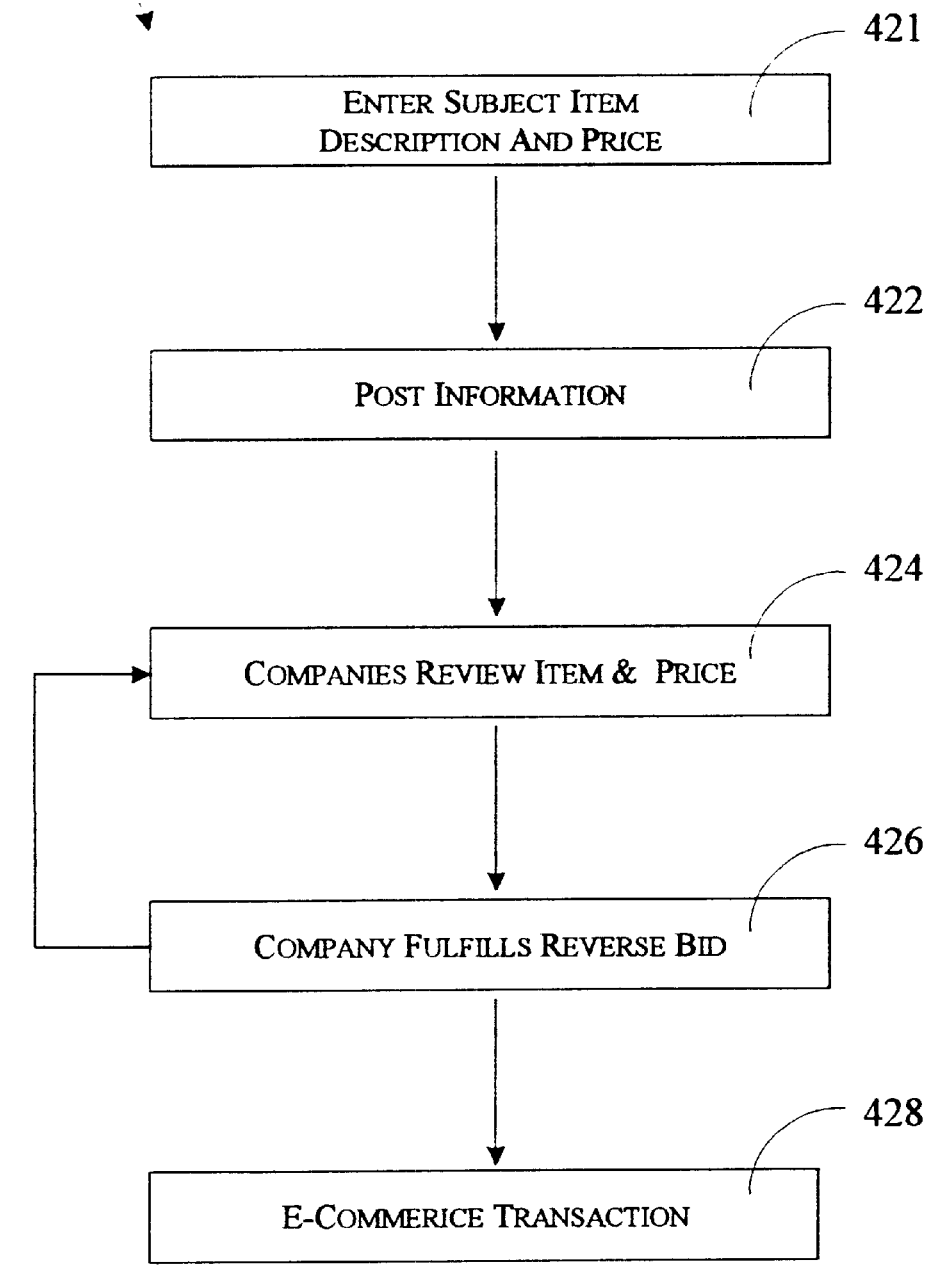
FIG. 6 illustrates a flow diagram of a reverse auction process for procurement of a bid price for an item using the Internet.

FIG. 5 illustrates a flow chart diagram consistent with a competitive bid process 405 for procurement of the lowest priced item using the world wide web. The competitive bid process 405 would enter a description of the subject item 410, post the information 412 on the world wide web, companies would review item and bid a price 414, the lowest bid information would be posted 415 on the web site. The companies can continue to review the current bid information and continue to place bids 414. When the lowest bid is reached 416, the time has expired, or some other trigger point is reached. the competitive bid process 405 closes with the e-commerce transaction 418. The item can then be physically delivered to the winning bidder. FIG. 6 illustrates a flow chart diagram consistent with a reverse auction process 420 for procurement of an item at a desirable price using the World Wide Web. The reverse auction process 420 would enter a description and desired transaction price of the subject item 421, post the information 422 on the world wide web, companies would review the item description 424 and bid at that price against the current inventory 426. When a party posts the respective item at the desired price, the reverse auction process 420 closes with the e-commerce transaction 428. The item can then delivered to the location of the party seeking the item.

Figure 7:
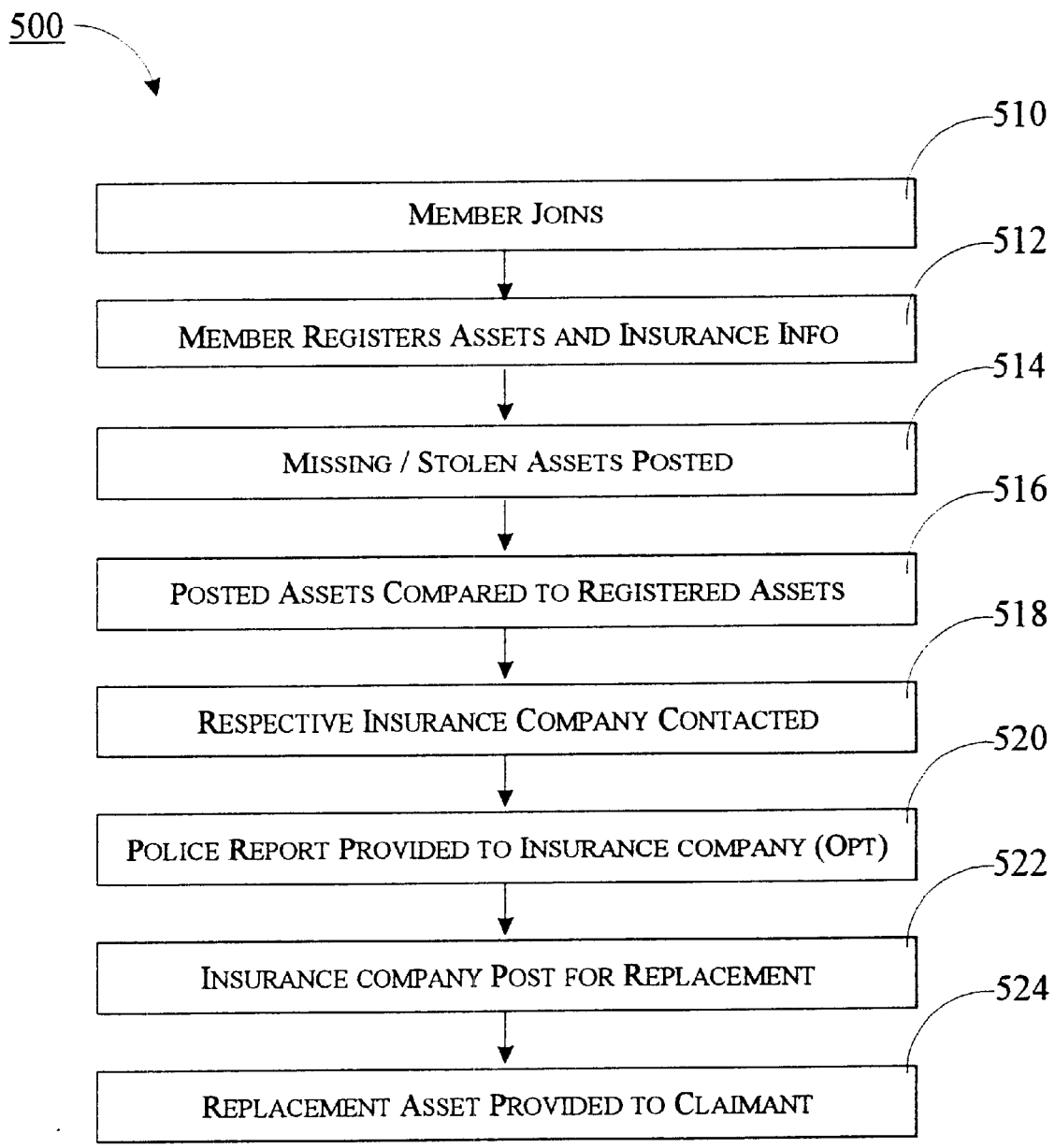
FIG. 7 illustrates a flow diagram of a member's pre-registration of assets and a means to notify an insurance company.
Figure 8:
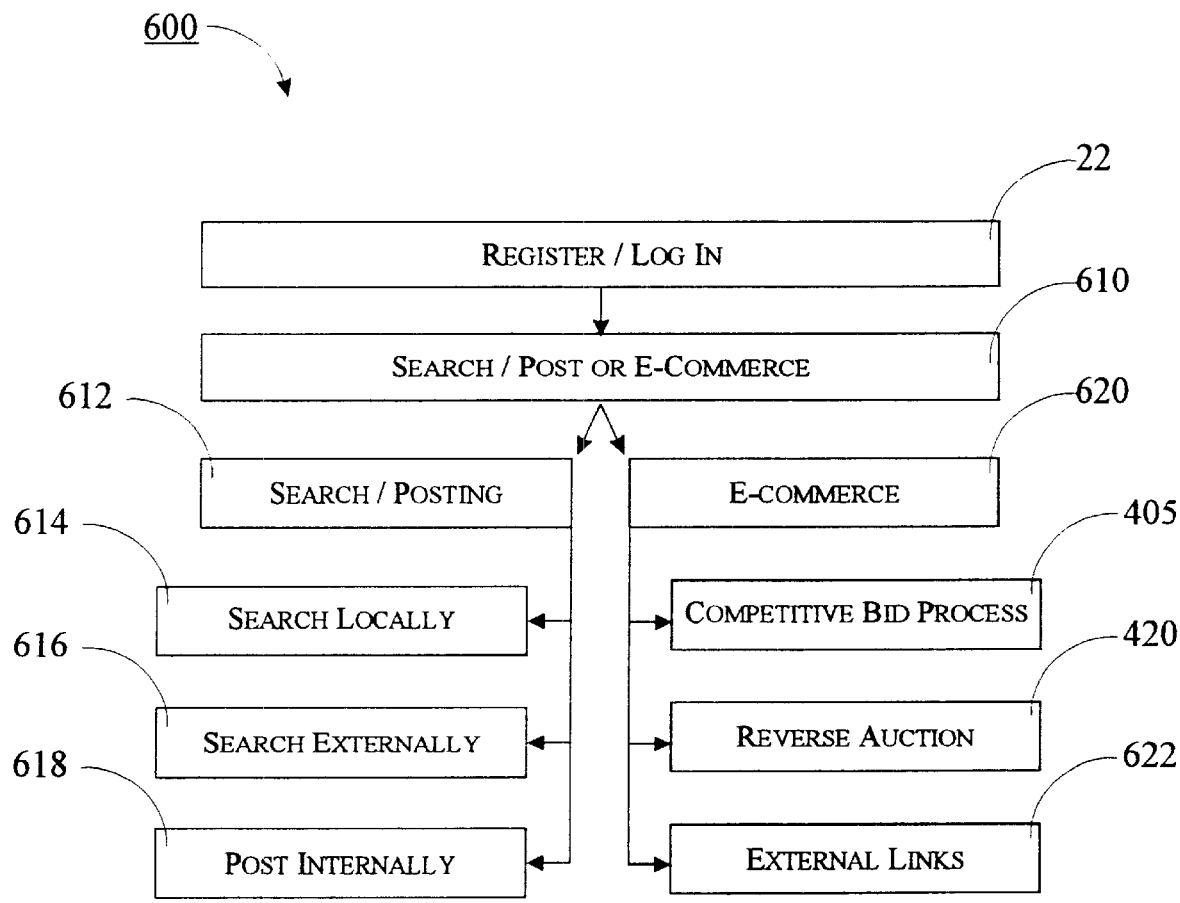
FIG. 8 illustrates the utilization of a portal in conjunction with the present invention.

FIG. 7 illustrates a flow chart diagram consistent with a member's pre-registration of assets and a means to notify an insurance company. A member would join 510 the registry by providing certain information such as name, address, phone number, and the like and if payment is required, a method of payment. Alternatively, the member may join through a third party such as an insurance company. This can be accomplished directly or indirectly such as through the insurance company. The member would provide a listing of all assets to be protected, including as much description as possible (Serial numbers, model numbers, options, features, photographs, value, etc.) and the respective insurance information, including contact information for the insurance company. The member would also provide the type of compensation (money and the like) if a claim is made against the subject asset(s). If the member has an asset registered and the asset becomes missing, the member can use the registry to provide details of the asset to the law enforcement agencies by entering the information and completing an affidavit. The information can be forwarded to the respective law enforcement agency via any notification method such as email, timed release of entries, and the like. As each item is posted as either missing or stolen, the database would compare the item (claimant, or other) against the previously registered assets 516 and continue based upon the outcome of the comparison. Should the process identify a posted item with a previously registered asset, the system would then contact the respective insurance company 518. The web site would preferably include the capabilities for law enforcement agencies to enter police reports, with the preferred embodiment where the police reports are only entered through the web site and stored accordingly. The missing I stolen asset information can be extracted from the police report and automatically posted to the web site. The web site would provide the capability to the insurance company to obtain a copy (hardcopy or electronic copy) of the police report,. The insurance company would then have sufficient information to complete an insurance claim. Should the member register as needing automatic replacement of the asset, the insurance company can utilize any of the known e-commerce methods for acquiring replacement assets 522. These processes can include electronic bidding process 405, a reverse auction 420, and other known method of purchasing goods and the like over the World Wide Web. Upon determining an acceptable transaction, the transaction would be completed and the replacement asset would be provided to the claimant 524. It can be recognized that the e-commerce features of the web site can be used by claimant, other users and the like. FIG. 8 illustrates the utilization of a web portal in conjunction with the present invention. The user would register, log in, or log on 22 to the web site. The web site would provide links to various options, whereby the links would be preferably in the form of icons or buttons. Icons or buttons are images presented on the web pages, whereby the user can point the cursor at the images and by clicking a select key. The web site would then take the appropriate actions. Two options 610 can be to either search or post 612 an asset or utilize an e-commerce feature 620. The user would select the search/posting 612 link and have several options available. These options can include searching locally 614, search externally 616, or posting internally. Internal use would be respective to the managed, stored database associated with the web site. External use would be use respective to an externally managed. stored database at other site. This would be beneficial to the user as the web site provider would be able to form alliances with other web site providers with similar databases such as lost and found. The alliances would also provide for external users to link to the internal database. The user can select the e-commerce 620 option, whereby the e-commerce option would provide various avenues for the user to complete transactions to procure assets. A preferred scenario would be to provide various e-commerce solutions to replace items that are missing or stolen. Examples of such e-commerce solutions include competitive bid process 405, reverse auctions 420 as previously described, or links to other web sites 622. An additional feature would be the ability for another web site based operating company to contact a respective party who has lost or had an asset stolen, such as by email and the like to offer to sell the party a replacement object.

The inventors have provided a business model, with several options for utilizing a database of missing and stolen goods, and missing persons. The utilization of the internet for a missing/stolen goods/missing persons database provides for improved timeliness in registering stolen assets, finding goods and persons and distributing the information.

While the invention has been described, disclosed, illustrated and shown in various terms of certain embodiments or modifications which it has presumed in practice, the scope of the invention is not intended to be. nor should it be deemed to be, limited thereby and such other modifications or embodiments as may be suggested by the teachings herein are particularly reserved especially as they fall within the breadth and scope of the claims here appended.

We claim:

1. A method of interacting with a world wide website portal having a database for stolen and missing items, comprising the steps of:

providing a means for entering information respective to stolen items and missing items solely onto a world wide web portal site, having a database of missing persons, fugitives, lost goods, recovered goods and stolen goods;

providing a means for storing entered information respective to the stolen and the missing items solely onto the world wide web portal site;

providing a means for searching the stored information solely on the world wide web portal site; and interacting with the site from remote locations solely using a computer connection.

2. The method of claim 1, whereby the method further comprises the step of:

extracting information from a police report to be solely entered onto the web portal site.

3. The method of claim 1, whereby the method further comprises the steps of:

providing a means for entering information into a registry as registered information solely on the web portal site, the registered information comprising at least a description of an asset and a method of contacting an interested party;

providing a means for storing registered information;

entering information on a found item into the site; and notifying a respective party if a match is found between the entered information and the found item.

4. The method of claim 1, whereby the method further comprises the steps of:

searching for an item within the database solely on the world wide web portal site;

displaying entries matching an item being searched; and displaying advertising banners which coincide with the item being searched.

5. The method of claim 1, whereby the method further comprises the step of:

providing a competitive bid process for replacement of an item.

6. The method of claim 1, whereby the method further comprises the step of:

providing a reverse auction process for replacement of an item.

7. The method of claim 1, whereby the method further comprises the step of:

interfacing with external databases on the world wide web to broaden the scope of available information.

8. A portal site for the world wide web, the portal site comprising:

an electronic database of stolen and missing items solely accessible by the world wide web the database includes lists of missing persons, fugitives, lost goods, recovered goods and stolen goods;

means for entering information into the electronic database solely through the world wide web;

means for at least one of searching, sorting and indexing the electronic database solely through the world wide web; and means for storing the electronic database on the world-wide web portal site.

9. The portal site of claim 8, further comprising:

means for providing e-commerce transactions including at least one of competitive bid process and reverse auction process.

10. A method of entering, storing, and interacting with a worldwide database containing information on missing and stolen items, comprising the steps of:

entering data information on a missing and a stolen item into a single database of missing persons, fugitives, lost goods, recovered goods and stolen goods, accessible solely through the world wide web;

storing the entered information in the database solely through the world wide web;

searching the database solely through the world wide web to determine if at least one of the entered missing items on the database matches a search inquiry; and displaying a result of the searching step to a user solely through the world wide web.

11. The method of claim 10, wherein the data information includes:

a police report.

* * * * *